United States Patent
Kiyota et al.

(10) Patent No.: US 6,911,600 B2
(45) Date of Patent: Jun. 28, 2005

(54) WATER-STOP STRUCTURE OF ELECTRIC CONNECTION BOX

(75) Inventors: Hirotaka Kiyota, Ogasa-gun (JP); Hiroki Goto, Kosai (JP); Yoshihiko Nakahama, Toyota (JP); Kazuhiro Kusuyama, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/883,971

(22) Filed: Jul. 6, 2004

(65) Prior Publication Data
US 2005/0045360 A1 Mar. 3, 2005

(30) Foreign Application Priority Data
Jul. 4, 2003 (JP) .................................... P2003-191835

(51) Int. Cl.[7] ................................................ H02G 3/18
(52) U.S. Cl. ............................... 174/65 G; 174/152 G; 174/65 R; 16/2.1; 248/56
(58) Field of Search .................. 174/65 G, 65 SS, 174/65 R, 152 G, 153 G, 131, 151; 248/56; 16/2.1, 2.2

(56) References Cited

U.S. PATENT DOCUMENTS

| | | | | |
|---|---|---|---|---|
| 6,372,986 B1 | * | 4/2002 | Saeki et al. | 174/65 G |
| 6,479,748 B2 | * | 11/2002 | Mori | 174/65 G |
| 6,525,269 B2 | * | 2/2003 | Sato | 174/65 G |

FOREIGN PATENT DOCUMENTS

| | | |
|---|---|---|
| JP | 54-119699 U | 8/1979 |
| JP | 7-203616 A | 8/1995 |
| JP | 8-140235 A | 5/1996 |
| JP | 8-168137 A | 6/1996 |
| JP | 8-322128 A | 12/1996 |
| JP | 10-224053 A | 8/1998 |

* cited by examiner

Primary Examiner—Dhiru R. Patel
(74) Attorney, Agent, or Firm—Sughrue Mion, PLLC

(57) ABSTRACT

A water-stop structure includes: an electric connection box body including a guide portion; a harness protector mounted in the guide portion; and a water-stop wall formed at the connection box body, which is disposed in opposed relation to an end of the harness protector.

9 Claims, 7 Drawing Sheets

WATER-STOP STRUCTURE OF ELECTRIC CONNECTION BOX

BACKGROUND OF THE INVENTION

This invention relates to a water-stop structure of an electric connection box having a harness protector mounted on its connection box body, in which the intrusion of water from the protector into the connection box body is prevented.

FIGS. 6 and 7 show one form of conventional water-stop structure of an electric connection box (see Patent Literature 1).

In this structure, a vertical opening 43 is formed in a main cover 42 made of a synthetic resin, and guide portions 44 are formed on opposite sides of the opening 43, respectively, and a block portion 45, having electric parts (such as relays and fuses) mounted thereon, is inserted into the interior of the main cover 42, and is fixed thereto, and wires, connected to the electric parts, are bundled together, and are passed outwardly through the opening 43, and a protector 46, including a half-split tubular portion 47 for harness-guiding purposes and a flange-like cover plate 48, is slidingly engaged in the guide portions 44 as shown in FIG. 7, so that the opening 43 is closed by the cover plate 48, and the upper side of the wire bundle is covered with the tubular portion 47 of the protector 46, and upper and lower covers (not shown), each made of a synthetic resin, are fitted on the main cover 42, thereby preventing rainwater from intruding into the opening 43 from the upper side.

The main cover 42, the block portion 45, the electric parts (such as relays and fuses) and the upper and lower covers jointly form the electric connection box 41. The harness-guiding tubular portion 47 is slanting downwardly, so that the intrusion of rainwater or the like into the tubular portion is prevented. The protector 46, including the tubular portion 47 and the cover plate 48, is molded into an integral construction, using a synthetic resin.
Patent Literature 1
 JP-A-8-322128

In the above conventional structure, there is no problem when the electric connection box 41 is mounted at a place where waterdrops fall only from the upper side. However, when the electric connection box was mounted at a place, such for example as in an engine room, where Water was hard splashed up from the lower side, there was a fear that water entered the wire-guiding tubular portion 47 from the lower side, and flowed along the tubular portion 47 to intrude into the main cover 42, or water intruded into the main cover 42 through a gap between the cover plate (flange wall) and each guide portion 44.

SUMMARY OF THE INVENTION

In view of the foregoing, it is an object of this invention to provide a water-stop structure of an electric connection box in which even when splashed water intrudes into a protector, or intrudes into a gap between a cover plate (flange wall) and a guide portion, the intrusion of the water into the interior of a main cover (that is, to a block portion having electric parts mounted thereon) is positively prevented.

In order to solve the aforesaid object, the invention is characterized by having the following arrangement, (1) A water-stop structure comprising:
 an electric connection box including a guide portion;
 a harness protector mounted in the guide portion; and
 a water-stop wall formed at the connection box body, which is disposed in opposed relation to an end of the harness protector.

(2) The water-stop structure according to (1), wherein the end of the harness protector is provided with a downwardly-directed flange wall disposed in opposed relation to the water-stop wall, and a water-guide gap is formed between the flange wall and the water-stop wall.

(3) The water-stop structure according to (2), wherein the connection box body includes a wall portion which is disposed beneath the harness protector and is continuous with the water-stop wall in intersecting relation thereto, and a first drain hole is formed through the wall portion.

(4) The water-stop structure according to (3), wherein the first drain hole is disposed immediately beneath or adjacent to the flange wall.

(5) The water-stop structure according to (1), wherein an end portion of the harness protector including the end thereof is disposed within the connection box body and is bent generally upwardly.

(6) The water-stop structure according to (1), wherein a lower end of an opening formed in the end of the harness protector is disposed substantially at the same level as an upper end of the water-stop wall.

(7) The water-stop structure according to (1), wherein the harness protector includes a flange wall at an intermediate portion thereof, which is slidingly engaged with the guide portion, and a second drain hole is formed at a lowermost portion of the guide portion.

(8) The water-stop structure according to (1), wherein a protector receiving portion is defined by the guide portion, opposite side wall portions extending from the guide portion, the water-stop wall and a wall portion disposed beneath the harness protector.

(9) The water-stop structure according to (1), wherein the harness protector includes a third drain hole formed through a portion of the harness protector disposed inwardly of the guide portion.

DETAILED DESCRIPTION OF PREFERRED EMBODIMENTS

A preferred embodiment of the present invention will now be described in detail with reference to the drawings.

Figure 1:
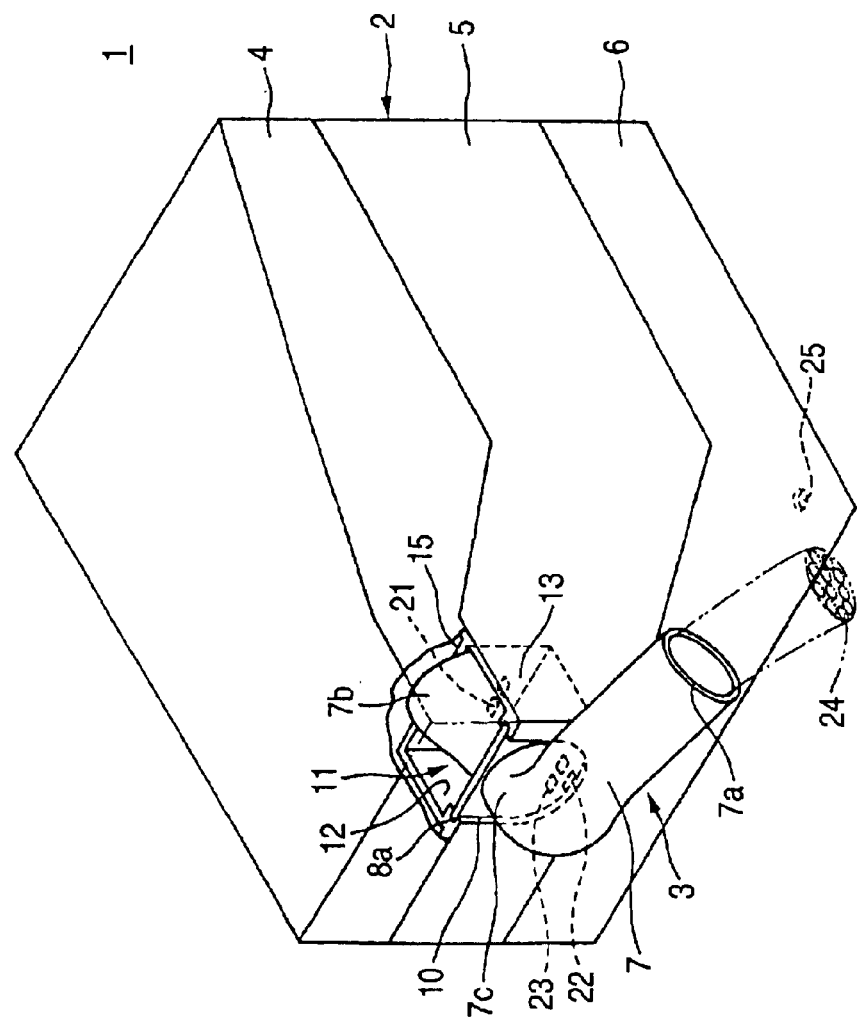
FIG. 1 is a schematic perspective view showing one preferred embodiment of a water-stop structure of an electric connection box of the invention, showing its overall construction.
Figure 2:
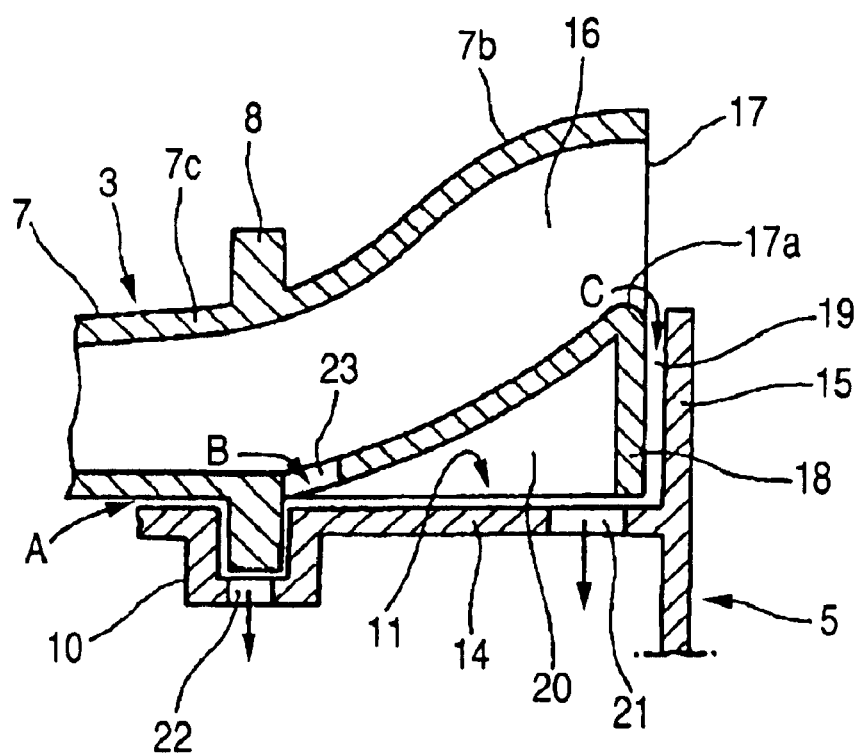
FIG. 2 is a schematic vertical cross-sectional view of an important portion of the water-stop structure.

FIGS. 1 to 2 are schematic views showing one preferred embodiment of a water-stop structure of an electric connection box of the invention.

As shown in FIG. 1, the electric connection box 1 comprises a connection box body 2 made of a synthetic resin, and a harness protector (hereinafter referred to as "protector") 3 made of a synthetic resin. The connection box body 2 comprises an upper cover 4, a main cover (intermediate cover) 2, and a lower cover 6, and the protector 3 is slidingly attached to the main cover 5 from the upper side. A block portion (not shown) is mounted within the main cover 5, and electric parts (not shown) such as fuses and relays, are mounted on the block portion. The covers 4 to 6 are releasably fixed to one another by retaining means (not shown).

The protector 3 includes a tubular portion 7, and a vertical flange-like cover plate (intermediate flange wall) 8 formed on the tubular portion intermediate opposite ends thereof. The tubular portion 7 is bent into a generally L-shape, and a distal end portion (having a distal end 7a) is slanting slightly downwardly relative to a horizontal plane. A plurality of wires (wire harness), connected to the plurality of electric parts (such as relays and fuses), are passed through the interior of the tubular portion 7, and are extended outwardly therefrom.

As shown also in FIG. 2, the tubular portion 7 of the protector 3 has a proximal end portion (tubular portion) 7b (which is to be received within the main cover 5) which is bent upwardly in a curved or a slanting manner. The vertical cover plate 8 is disposed forwardly of this upwardly-bent portion 7b. The cover plate 8 has a flange-like sliding-engagement portion 8a of a generally U-shape formed on its right, left and lower sides, and this sliding-engagement portion 8a is slidingly engaged in a guide portion 10 formed at an edge portion of a generally U-shaped opening formed in the main cover 5. An upper end of the cover plate 8 is disposed generally at the same level as an upper end of the guide portion 10.

As shown in FIGS. 1 and 2, in the water-stop structure of the electric connection box, a protector receiving portion 11 for receiving the proximal end portion (the upwardly-bent portion) 7b of the protector 3 is formed integrally with the main cover 5, and the protector receiving portion 11 includes vertical left and right wall portions 12 and 13 (The right wall portion serves also as an outer wall of the main cover 5), a horizontal bottom (lower) wall portion 14 (FIG. 2), and a vertical rear wall portion serving as a water-stop wall 15. Here, the rear side is so defined when that side from which the protector 3 is led out is defined as the front side.

As shown in FIG. 2, the water-stop wall 15 extends generally to the same level as a lower end 17a of an opening 17 of a harness passage bore 16 of the upwardly-bent portion (proximal end portion) 7b of the protector 3. A vertically downwardly-extending flange wall 18 is formed at an edge of the opening 17, and a small gap 19 is formed between the flange wall 18 and the water-stop wall 15. A vertical rib plate 20 is formed on the lower side of the protector 3, and extends in the longitudinal direction, and the flange portion 18 is continuous with the rib plate 20 in perpendicular relation thereto. Drain holed (first drain holed) 21 are formed through the bottom wall 14 of the protector receiving portion 11 of the main cover 5, and are disposed adjacent (near) to the water-stop wall 15. As shown in FIG. 1, the lower side of the protector receiving portion 11 of the main cover 5 is notched to be open to the outside, and is covered with the lower-cover 6.

In FIG. 2, a drain hole (second drain hole) 22 is formed through a bottom portion (lowermost portion) of the U-shaped guide portion 10 of the main cover 5 in which the vertical cover plate 8 of the protector 3 is slidingly engaged. The bottom surface of the guide portion 10 is disposed at a level lower than the bottom wall surface of the protector receiving portion 11.

Drain holes (third drain holes) 23 are formed through that portion of the tubular portion 7 disposed immediately adjacent to the rear side of the cover plate 8 of the protector 3. The cover plate 8 is disposed at the boundary between the rear-side upwardly-bent portion 7b and a front-side short horizontal portion 7c.

Water, having intruded into a gap between the cover plate 8 of the protector 3 and the guide portion 10 of the main cover 5, is discharged via the drain hole 22 to the outside of the main cover 5, that is, to the outside of the protector receiving portion 11, as indicated by arrow A in FIG. 2. Water, having intruded from the outside into the interior of the protector 3 via the front opening 7a of the protector 3 (FIG. 1) or along the wires 24 (FIG. 1) as indicated by arrow B, is first discharged to the outside of the protector 3 via the drain holes 23 in the intermediate portion of the protector, and then is discharged to the outside of the outside of the main cover 5 via the drain hole 22 in the guide portion 10 or via the drain holes 21 in the bottom wall 14 of the receiving portion 11. Water, having intruded into an intermediate portion of the upwardly-bent portion 7b of the protector 3, drops along the inner surface of the bent portion 7b because of its own weight, and is discharged to the outside of the main cover 5 via the drain holes 23 (in the protector) and the drain hole 22 in the guide portion 10.

Water, reaching the open end 17 at the apex of the tubular portion 7, impinges on the water-stop wall 15, and smoothly drops along the gap 19 between the water-stop wall 15 and the downwardly-directed flange wall 18 (that is, along the water-stop wall 15 and the flange wall 18) as indicated by arrow C, and is discharged to the outside of the main cover 5 via the drain hole 21 in the bottom wall 14 disposed immediately beneath the flange wall 18.

Water, thus discharged to the outside of the main cover 5, is discharged to the outside of the electric connection box 1 via a drain hole 25 (FIG. 1) formed in a lowermost portion of the lower cover 6. Any electric parts, such as relays and fuses, are not provided in the lower cover 6, and therefore even when waterdrops fall onto the lower cover 6, any problem, such as short-circuiting and rust, is not encountered.

Figure 3:
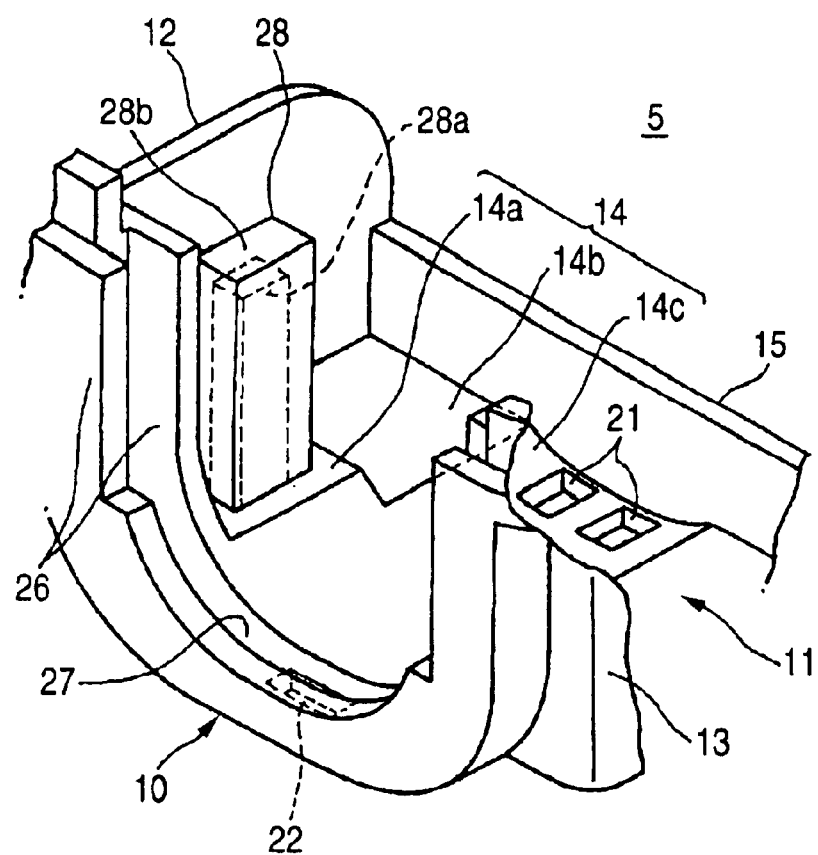
FIG. 3 is perspective view showing one example of a protector receiving portion of a main cover having the water-stop structure.
Figure 4:
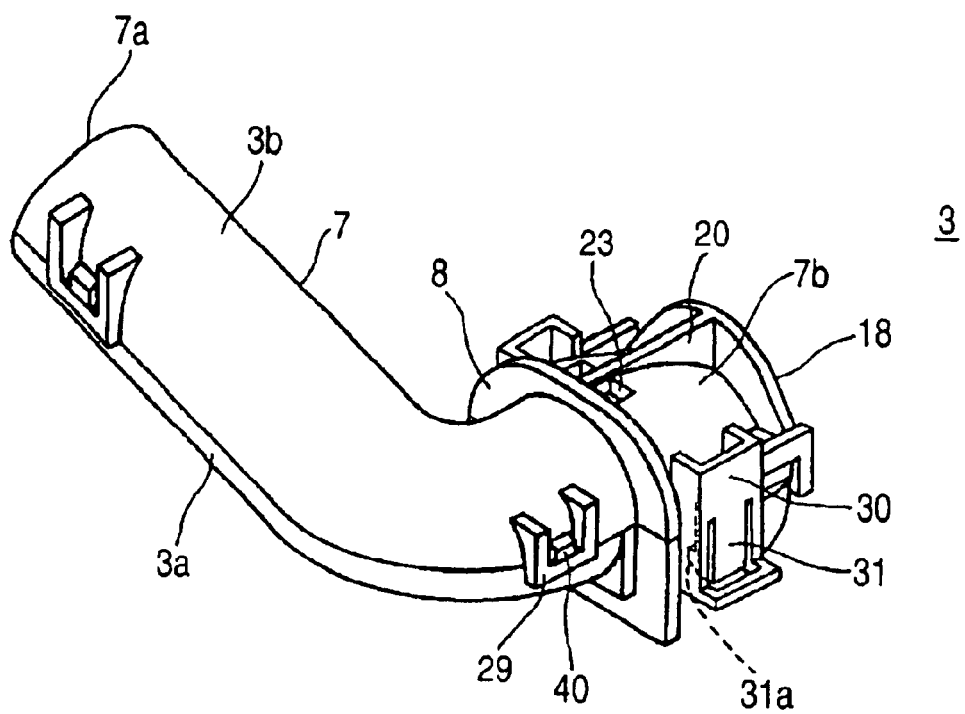
FIG. 4 is a perspective view showing one example of a protector.
Figure 5:
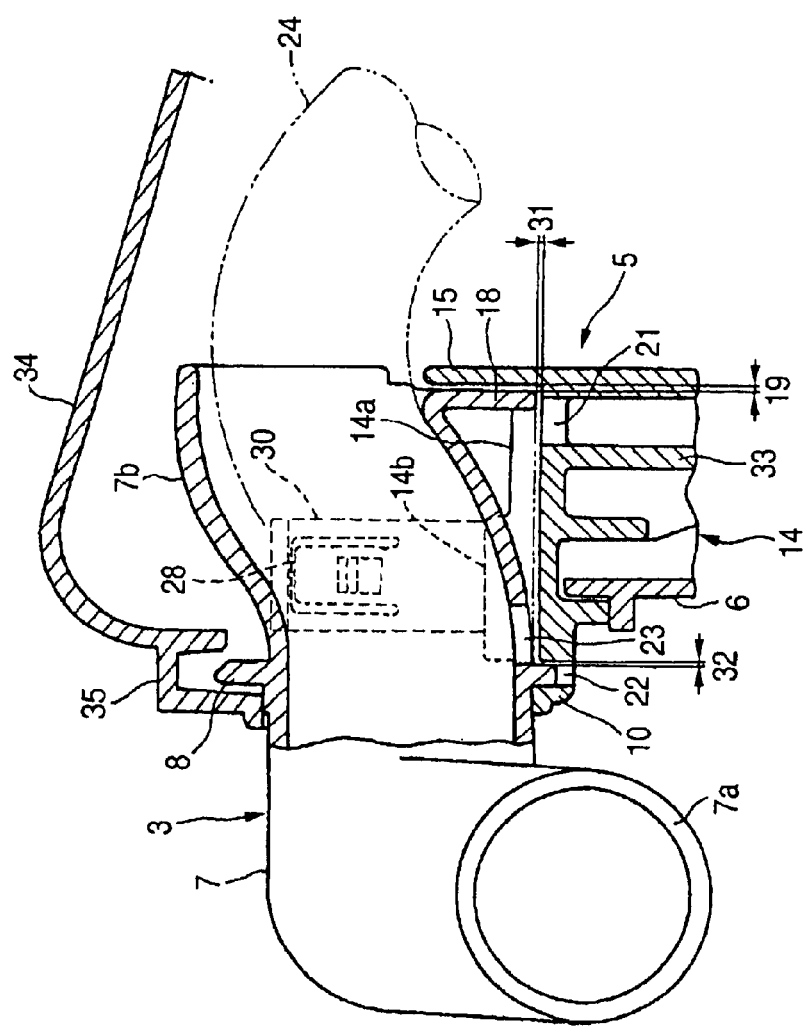
FIG. 5 is a vertical cross-sectional view showing a condition in which the protector is mounted on the main cover.
Figure 6:
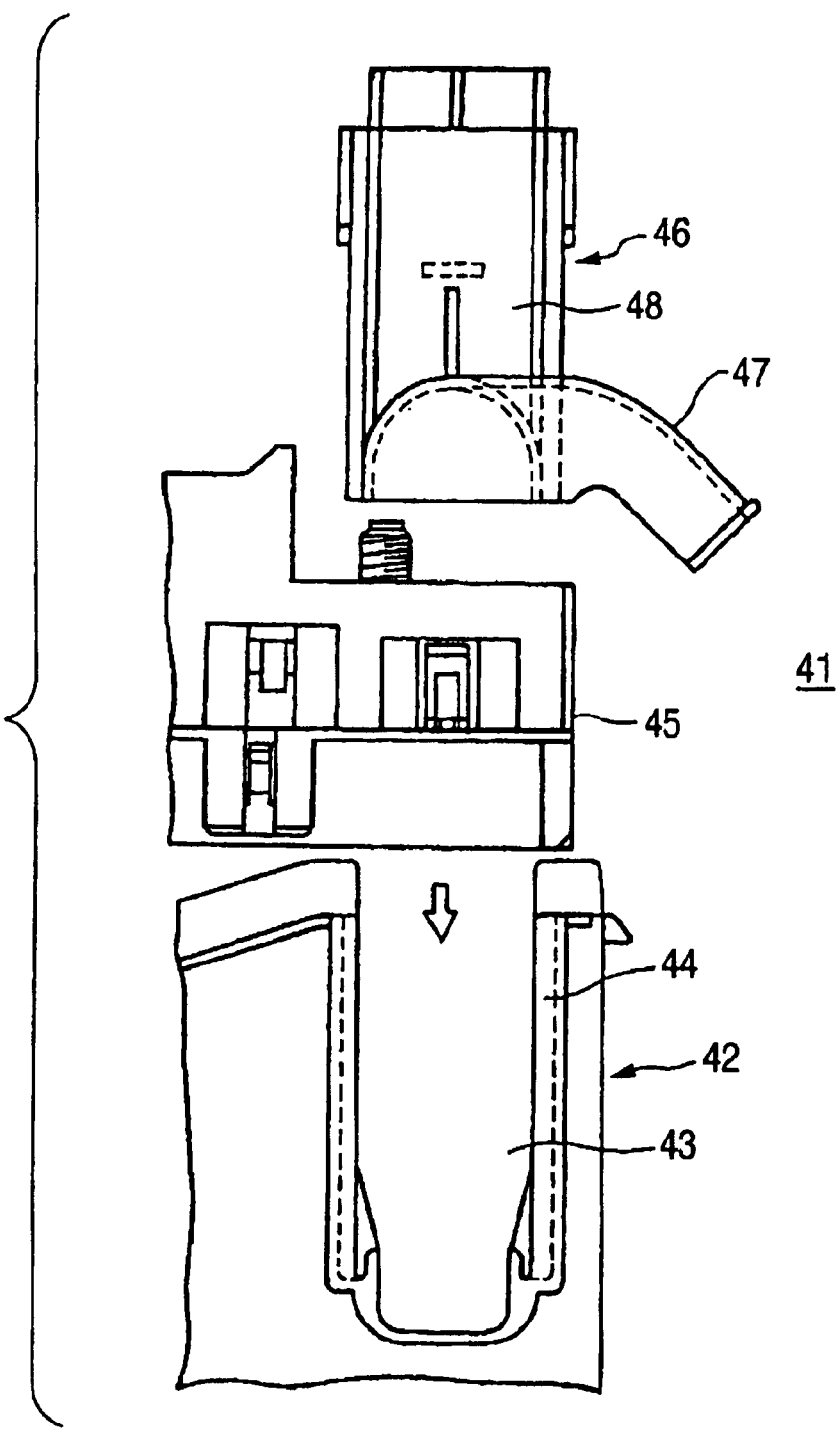
FIG. 6 is an exploded, front-elevational view showing one example of a water-stop structure of a conventional electric connection box.
Figure 7:
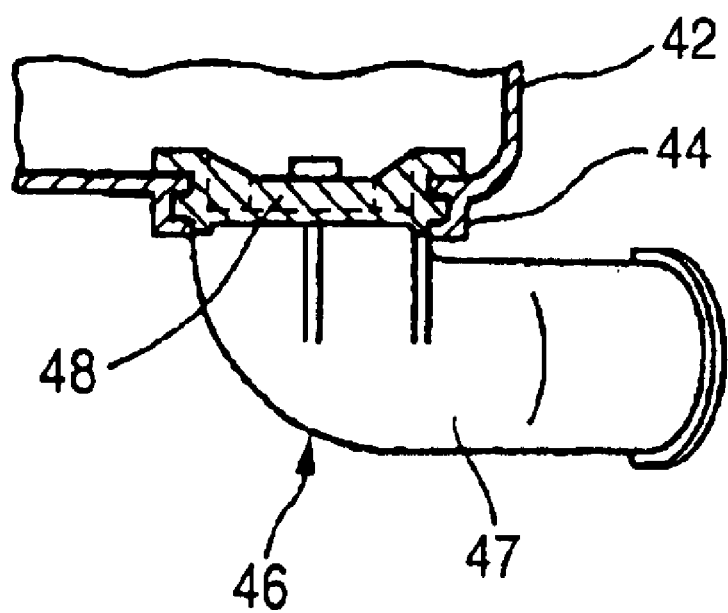
FIG. 7 is a cross-sectional view showing a mounted condition thereof.

FIG. 3 is a detailed view of the protector receiving portion 11 of the main cover 5, and FIG. 4 is a detailed view of the protector 3 (which is inverted with respect to the condition of FIG. 1), and FIG. 5 is a detailed cross-sectional view showing a condition in which the protector 3 is mounted on the main cover 5.

As shown in FIG. 3, the guide portion 10 of the main cover 5 includes a double wall 26 consisting of two (inner and outer) walls spaced from each other in the direction of the wall thickness, and a peripheral wall 27 provided between the two walls 26, and a guide groove (designated by reference numeral 27 for convenience' sake) is defined by the double wall 26 and the peripheral wall 27. The drain hole 22 is formed in a central portion of a bottom portion of the peripheral wall 27. The guide portion 10 is continuous with the vertical left and right wall portions 12 and 13 in perpendicular relation thereto (The right wall portion 13 serves also as the outer wall of the main cover 5). The horizontal bottom wall portion 14 extends between the opposite side wall portions 12 and 13 in perpendicular relation thereto, and also the vertical rear water-stop wall 15 extends between the opposite side wall portions 12 and 13 in perpendicular relation thereto. The protector receiving portion 11 of a generally rectangular shape is defined by the front guide portion 11, the opposite side wall portions 12 and 13, the bottom wall portion 14 and the rear water-stop wall 15.

The water-stop wall 15 is smaller in height than the left and right wall portions 12 and 13. The bottom wall 14 is stepped such that its front half portion 14a is higher than its rear half portion 14b. A recess 14c of an arcuate shape is formed in a widthwise-central portion of the bottom wall 14, and the pair of right and left drain holes 21, disposed immediately beneath the water-stop wall, are formed in a lowermost portion of the recess 14c. Water, having intruded onto the bottom wall 14 from the outside, is collected into the lower recess 14c, and is discharged to the outside of the protector receiving portion 11 via the central drain holes 21.

A pair of right and left symmetrical protector-retaining support posts 28 are formed upright on the front half portion 14a of the bottom wall 14, and a retaining recess 28a is formed in an outer surface of each of the support posts 28, and an upper end of each support post 28 is formed into a horizontal retaining wall 28b.

As shown in FIG. 4, the protector 3 can be separated generally centrally of the height of the tubular portion 7 and also of the height of the cover plate 8, and therefore can be divided into upper and lower sections. These division-section members 3a and 3b are connected together by retaining frame-like portions 29 and engagement projections 40. FIG. 4 shows an inverted condition of the normal mode of use in order to show the lower drain hole 23.

Downwardly-extending support pillars 30 of a generally U-shaped cross-section for engagement respectively with the retaining support posts 28 (FIG. 3) are formed on the upper division-section member 3a at the upwardly-bent portion 7b of the tubular portion 7. Each of the engagement pillars 30 has an upwardly-directed elastic engagement arm 31, and an inwardly-directed engagement projection 31a is formed at an upper end of the engagement arm 31. When the protector 3 is mounted, the pillars 30 are slidingly engaged with the support posts 28, respectively with the engagement projections 31a engaged respectively in the retaining recesses 28a (shown in FIG. 3).

The vertical rib plate 20 is formed on a central portion of the bottom of the lower division-section member 3b at the upwardly-bent portion 7b. This rib plate 20 is continuous with the flange wall 18 at the open end in perpendicular relation thereto, and the pair of drain holes 23 are formed immediately adjacent to the rear side of the vertical cover plate 8, and are disposed on opposite sides of the rib plate 20, respectively. The bent portion 7b starts or extends from the cover plate 8 in an upwardly-bent condition, and the drain holes 23 are disposed at a lowermost portion of this starting portion. In the mounted condition of the protector 3, the drain holes 23 are located above the drain hole 22 formed in the guide portion 10), and are disposed near to this drain hole 22. The tubular portion (designated by reference numeral 7a for convenience' sake), projecting forwardly from the cover plate 8 (that is, projecting outwardly from the protector receiving portion), is slanting downwardly.

A space within the protector receiving portion 11 (FIG. 3) is divided into two sections by the vertical rib plate 20, and the pair of drain holes 21 in the bottom wall 14 of the receiving portion are isolated right and left from each other by this rib plate 20 (The rib plate 20 is disposed between the pair of drain holes 21). With this construction, waterdrops, entering either of the right and left side portions of the protector receiving portion (receiving space) 11, are rapidly discharged from the space (divided into the two narrow sections) via the corresponding drain hole 21.

When the protector 3 is mounted on the main cover 5 as shown in FIG. 5, the water-stop wall 15 and the flange wall 18 are disposed at the same height, and the gap 19 is formed between the water-stop wall 15 and the flange wall 18, and a gap 31X is formed between the lower end of the flange wall 18 and the drain holes 21 in the bottom wall 14, and a gap 32 is formed between the guide portion 10 and the cover plate 8. Water drops, entering the protector receiving portion 11 via the gaps 19, 31X and 32, are rapidly discharged therefrom via the drain holes 21 and 22. Water, discharged via the drain holes 21 disposed immediately beneath the flange wall, flows along an inner surface of a frame-like wall portion 33 into the interior of the lower cover 6. Thanks to the provision of the lower cover a reverse flow of the water through the drain holes 21 (that is, the intrusion of water from the outside via the drain holes 21) is prevented.

In FIG. 5, reference numeral 34 denotes an upper cover. The upper cover 34 has an upper guide portion 35 disposed in contiguous relation to the guide portion 10 of the main cover 5, and the upper guide portion 35 is held in intimate contact with the upper end portion of the cover plate 8 through an inner waterproof packing. The wire harness (wires) 24 is passed through the upwardly-bent portion 7b of the protector 3, and is bent downwardly within the main cover 5, and is connected to the electric parts (such as fuses and relays) mounted on the block portion (not shown).

Thanks to the provision of the upwardly-bent portion 7b of the protector 3, water is less liable to intrude into the main cover 5 from the outside. The protector receiving portion 11 also prevents water from intruding into the main cover 5. In addition, the intrusion of water into the main cover 5 is positively prevented by the drain holes 23 (formed in the protector 3), the water-stop wall 15 of the protector receiving portion 11 and the drain holes 21 and 22 in the protector receiving portion 11.

The above water-stop structure is not limited to the connection box body 2 comprising the main cover 5, and the upper and lower covers 4 and 6, but can be applied to the type of connection box body comprising the main cover, having the lower cover formed integrally therewith, and the upper cover.

As described above, according to the invention, water, tending to intrude into the connection box body, is blocked by the water-stop wall, and therefore adverse effects (such as short-circuiting and rust) on the electric parts (such as fuses and relays), electronic units and a circuit board within the connection box body, are prevented, so that the quality of the electric connection box is secured for a long period of time.

According to the invention, water, tending to intrude into the connection box body, is guided into the gap between the flange wall and the water-stop wall, and smoothly drops, and therefore the water-discharging efficiency and reliability are enhanced, thus enhancing the water-stop ability, and adverse effects of water on the electric parts and electronic units within the electric connection box are more positively prevented.

According to the invention, water, dropped along the water-stop wall and the flange wall, is discharged to the outside via the first drain hole in the lower wall portion, and therefore adverse effects of water on the electric parts and electronic units within the electric connection box are more positively prevented, so that the quality of the electric connection box is more positively maintained over a long period of time.

According to the invention, water, dropped along the water-stop wall and the flange wall, is immediately discharged to the outside via the drain hole, and therefore adverse effects on the interior of the electric connection box are more positively prevented, so that the quality of the electric connection box is more positively maintained over a long period of time.

According to the invention, water, reaching the open end of the harness protector, is kept to a small amount by the upwardly-bent portion, and therefore even when water fiercely flows into the harness protector, this water is positively blocked by the water-stop wall and the flange wall, and the quality of the electric connection box is maintained over a long period of time.

According to the invention, water, tending to intrude into the connection box body via the lower end of the opening in the harness protector, impinges on the upper end of the water-stop wall, and smoothly drops along the surfaces of the water-stop wall and flange wall or after guided into the gap between the water-stop wall and the flange wall. Therefore, the intrusion of water into the connection box body can be positively prevented without making it difficult to pass the wire harness through the protector.

According to the invention, water, tending to intrude into the connection box body via the gap between the flange wall and the guide portion, is discharged to the outside via the second drain hole, and the intrusion of water from the guide portion-side can also be dealt with, and therefore the intrusion of water into the connection box body is positively prevented, so that the quality of the electric connection box is maintained over a long period of time.

According to the invention, even when a large amount of water intrudes at one time, this water is kept in the protector receiving portion, and therefore is positively discharged to the outside via the first and/or second drain hole, thus securing the water-stop ability.

According to the invention, water, flowed into the harness protector, is discharged to the outside of the protector via the third drain hole before reaching the open end of the protector, and this water is discharged to the outside via the first and/or second drain hole, and therefore the water-stop ability is further enhanced, so that the quality of the electric connection box is maintained for a longer period of time.

What is claimed is:

1. A water-stop structure comprising:
   an electric connection box including a guide portion;
   a harness protector mounted in the guide portion; and
   a water-stop wall formed at the connection box body, which is disposed in opposed relation to an end of the harness protector.

2. The water-stop structure according to claim 1, wherein the end of the harness protector is provided with a downwardly-directed flange wall disposed in opposed relation to the water-stop wall, and a water-guide gap is formed between the flange wall and the water-stop wall.

3. The water-stop structure according to claim 2, wherein the connection box body includes a wall portion which is disposed beneath the harness protector and is continuous with the water-stop wall in intersecting relation thereto, and a first drain hole is formed through the wall portion.

4. The water-stop structure according to claim 3, wherein the first drain hole is disposed immediately beneath or adjacent to the flange wall.

5. The water-stop structure according to claim 1, wherein an end portion of the harness protector including the end thereof is disposed within the connection box body and is bent generally upwardly.

6. The water-stop structure according to claim 1, wherein a lower end of an opening formed in the end of the harness protector is disposed substantially at the same level as an upper end of the water-stop wall.

7. The water-stop structure according to claim 1, wherein the harness protector includes a flange wall at an intermediate portion thereof, which is slidingly engaged with the guide portion, and a second drain hole is formed at a lowermost portion of the guide portion.

8. The water-stop structure according to claim 1, wherein a protector receiving portion is defined by the guide portion, opposite side wall portions extending from the guide portion, the water-stop wall and a wall portion disposed beneath the harness protector.

9. The water-stop structure according to claim 1, wherein the harness protector includes a third drain hole formed through a portion of the harness protector disposed inwardly of the guide portion.

* * * * *